United States Patent Office 2,833,198
Patented May 6, 1958

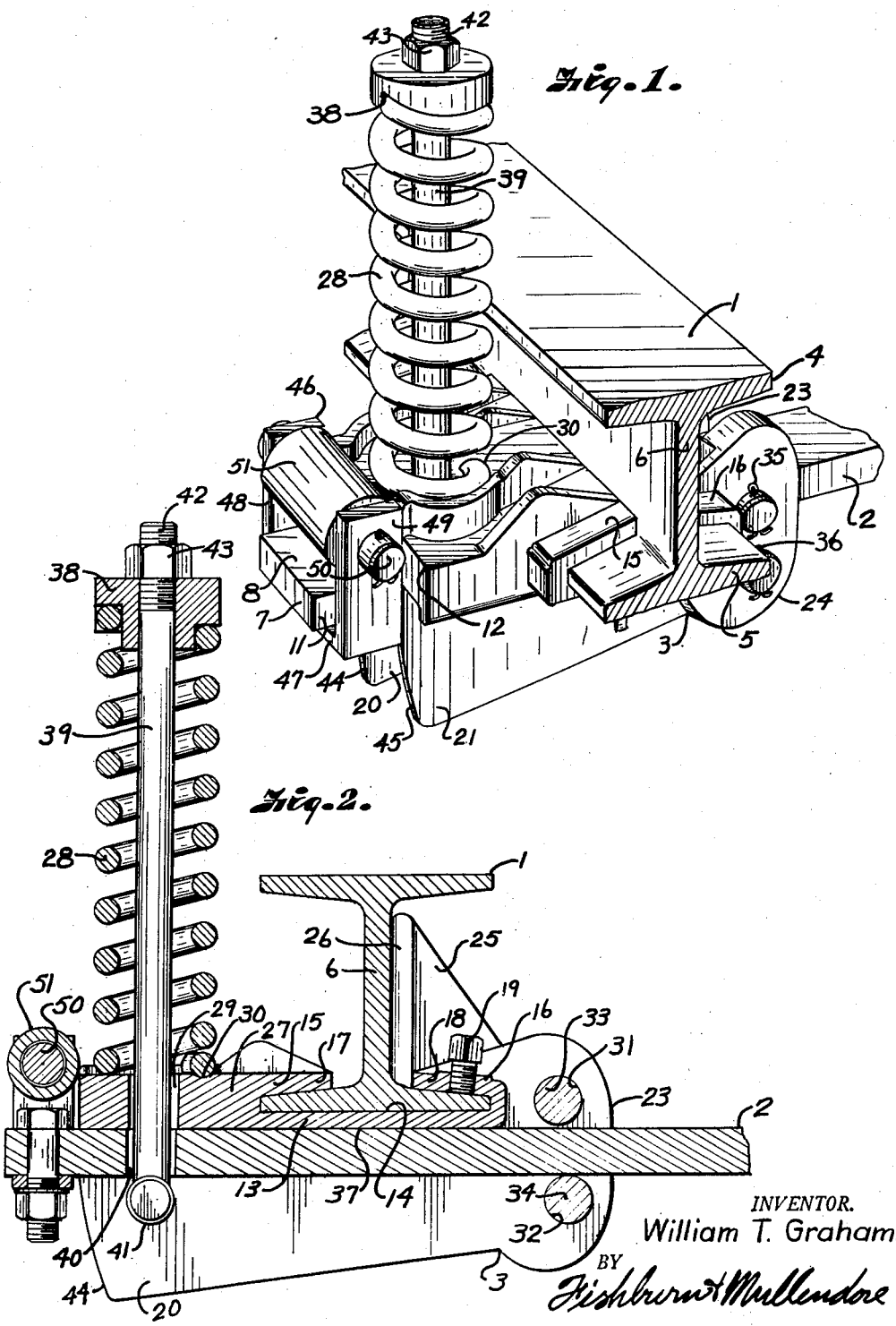

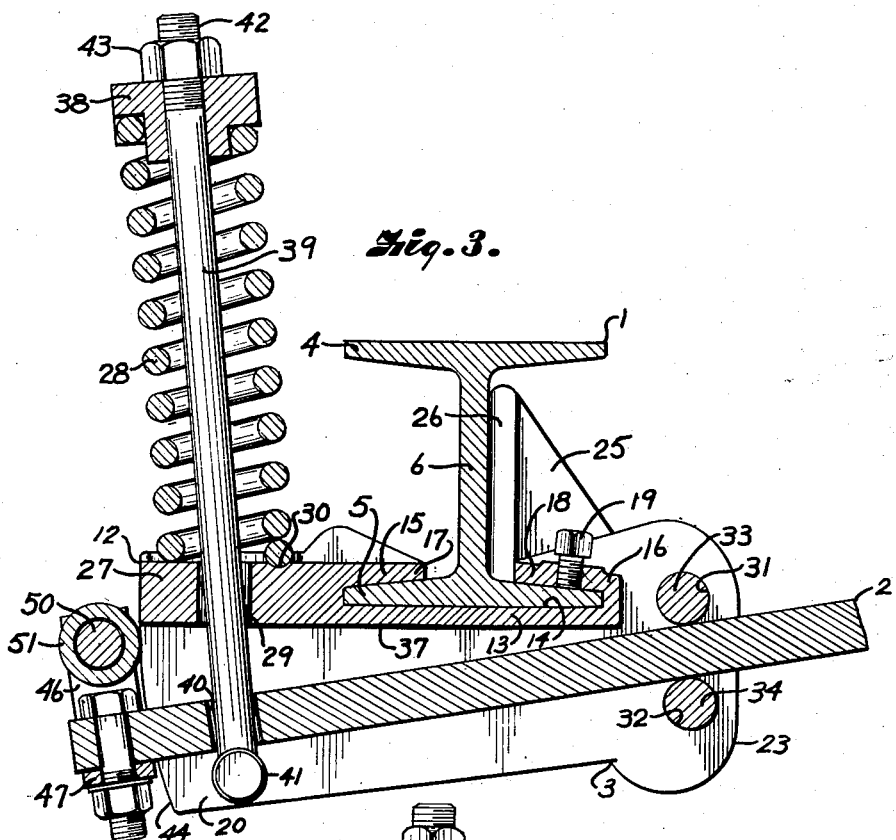

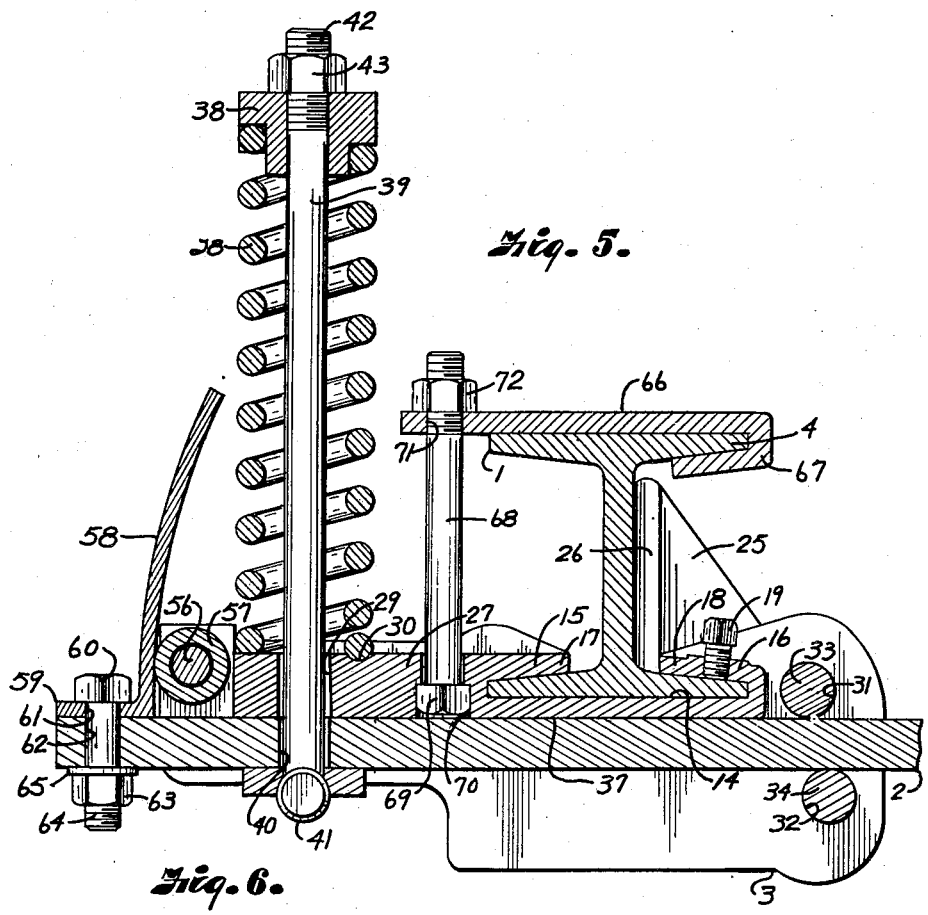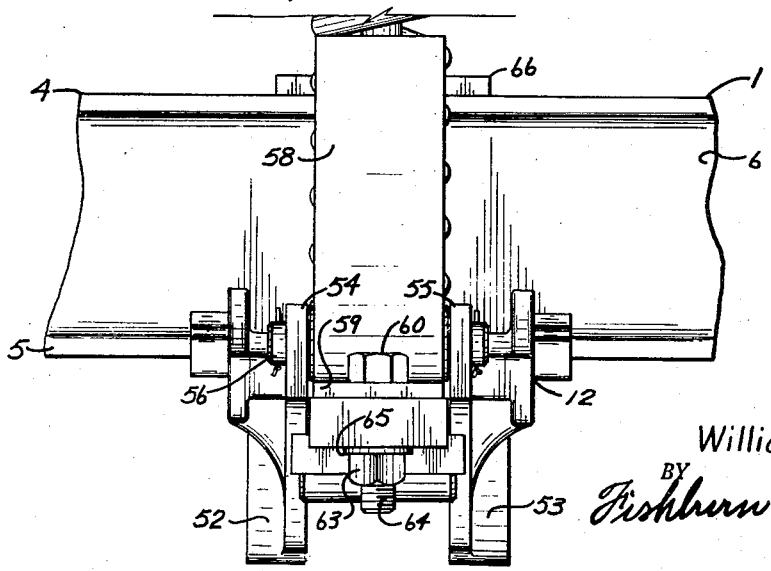

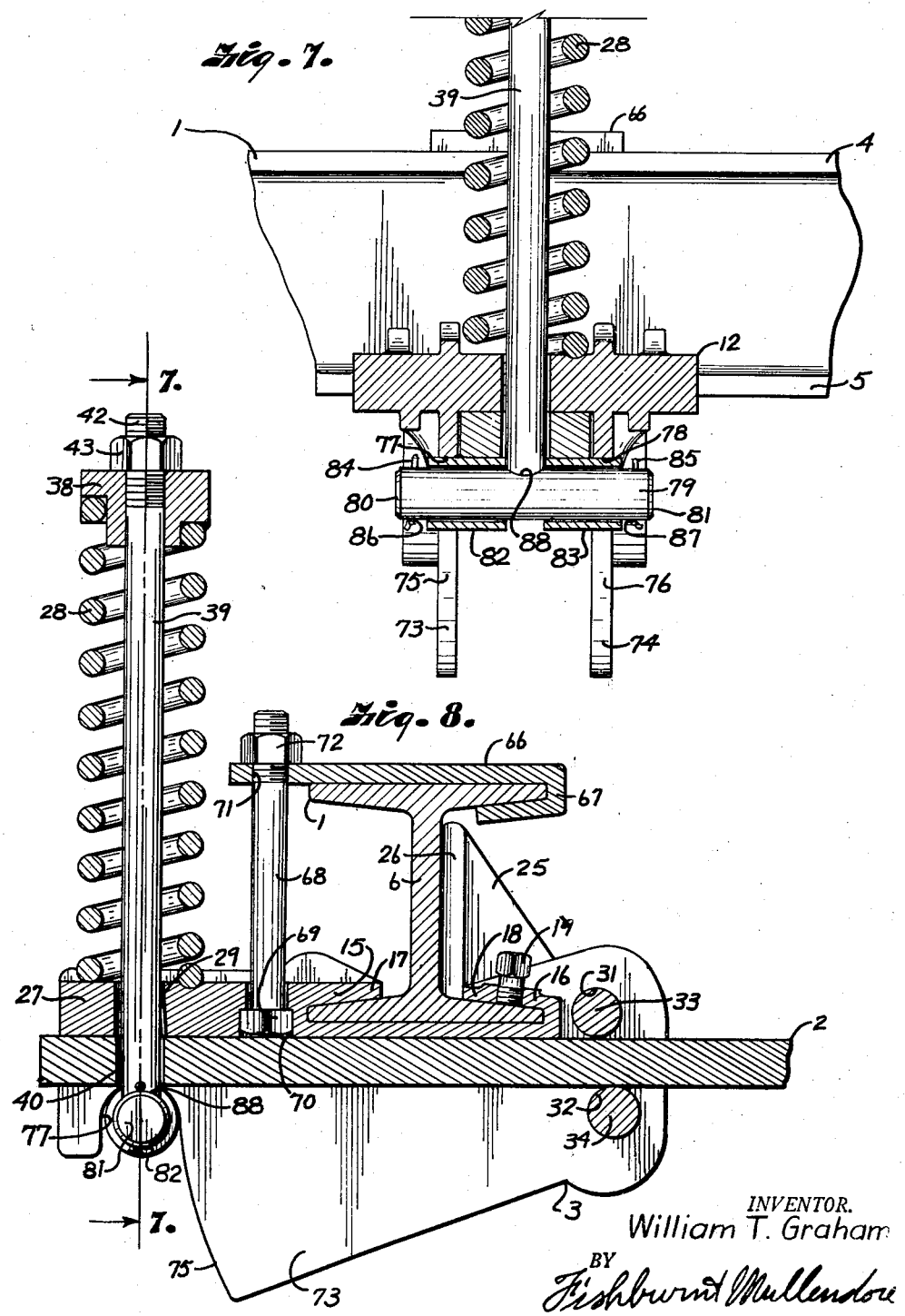

2,833,198

MOUNTING FOR THE SHANKS OF THE GROUND WORKING TOOL OF A PLOW

William T. Graham, Amarillo, Tex.

Application September 26, 1956, Serial No. 612,319

4 Claims. (Cl. 97—47.84)

This invention relates to a mounting for the shanks of the ground working tools of a plow wherein the ground working tools have yieldable rocking connection with the mobile frame of the plow, and is a continuation in part of my application Serial No. 263,245, filed December 26, 1951, now abandoned.

The principal objects of the present invention are to provide a mounting of this character which is of simple, light weight construction and in which the shank member is directly pivoted between spaced transverse pins on a fixed bracket member and retained in contact therewith by a spring having one end seated on one member and the other end connected with the other member to allow yieldable rocking movement of the shank.

A further object of the invention is to provide a guide means for controlling relative longitudinal movement of the shank while providing the rocking action and reducing wear on the spring connection, and to provide a rotatable mounting including a roller and arcuate guide arrangement of the shank whereby the engagement of the roller and arcuate surface of the guide acts independently of the spring to limit rearward movement only of the shank during rocking movement of the shank.

In accomplishing these and other objects of the invention as hereinafter pointed out, I have provided improved structure, the perferred forms of which are illustrated in the accompanying drawings, wherein:

Fig. 1 is a perspective view of a portion of the plow frame and shank of a ground working tool that is connected therewith by a shank mounting constructed in accordance with the present invention.

Fig. 2 is a longitudinal section of the mounting shown in Fig. 1.

Fig. 3 is a similar longitudinal section but showing the shank in vibratory or rocking action.

Fig. 4 is a front end elevational view of the mounting.

Fig. 5 is a longitudinal section through a modified form of mounting which includes the features of the present invention.

Fig. 6 is an end elevational view of the mounting illustrated in Fig. 5.

Fig. 7 is a cross section through a further modified form of the invention, the section being taken on the line 7—7, of Fig. 8.

Fig. 8 is a longitudinal section through the clamp illustrated in Fig. 7.

Referring more in detail to the drawings and first to the form of the invention illustrated in Figs. 1 to 4, inclusive:

1 designates a transverse beam of a plow frame to which shanks 2 of ground working tools (not shown) are attached by mountings 3 which are constructed in accordance with the present invention. The transverse beam 1 is of I shape cross section and has upper and lower flanges 4 and 5 connected by a web 6. Since all of the shanks 2 and mountings 3 are identical construction, only one is illustrated in the drawings.

The shank 2 consists of a bar having its forward end 7 extending transversely under the beam and its rear end curving downwardly and forwardly to carry a ground working tool which forms no part of the present invention and therefore is not illustrated. The shank 2 is of rectangular cross-section and has substantially flat upper and lower faces 8 and 9 and side faces 10 and 11.

The mounting 3 includes a fixed bracket or part 12 having a plate portion 13 provided with a flat upper face 14 corresponding with the width of the lower flange 5 and which is retained in close engagement therewith by flanges 15 and 16 that project upwardly from the plate portion 13 at the front and rear sides of the beam and which have portions 17 and 18 overlapping the upper faces of the flange 5 as shown in Figs. 2, 3 and 4.

The width of the plate portion 12 is such as to provide ample contact area with the under side of the flange 5 so as to assure firm connection when the bracket 12 is secured to the beam member 1 by a fastening device such as a setscrew 19 threaded through the inturned portion of the flange 16 so that the shank of the setscrew bears against the lower flange 5 and draws the plate portion 13 tightly against the under face of the beam 1.

Depending from the under side of the plate portion 13 are laterally spaced parallel flanges 20 and 21 to provide an open bottom channel or way 22 conforming to the width of shank 2 and in which the shank 2 is adapted to rock as later described. The flanges 20 and 21 extend rearwardly from the plate portion 13 and upwardly over the flange 16 to provide rearwardly projecting, spaced apart ears 23 and 24 that are preferably thicker than the main portions of the flanges. Extending upwardly from the portion of the ears overlying the flange 16 are webs 25 carrying pads 26 that bear against the rear face of the web 6 for distributing the forces applied under action of the shank 2 to the upper part of the beam 1.

The forward side of the plate 13 and flanges 20 and 21 project a sufficient distance from the beam member 1 to provide a support 27 for a spring 28. The supporting portion 27 is relatively thick to provide the necessary strength and to accommodate an elongated opening 29, Figs. 2 and 3, which extends therethrough in the axis of a spring seat 30 that is provided upon the upper side of the plate extension 27 as best shown in Figs. 1 and 2.

The ears 23 and 24 are each provided with upper and lower openings 31 and 32 that are spaced apart in accordance with the thickness of the shank 2 for mounting the ends of fulcrum pins 33 and 34. The shank 2 is passed between the fulcrum pins so that the upper and lower faces 8 and 9 thereof may contact the fulcrum pins incidental to rocking of the shank as later described. The pins 33 and 34 are retained in position by cotter pins 35 and 36 which extend through the outer ends of the pins. The upper and lower faces 8 and 9 of the shank contacts the fulcrum pins 33 and 34, but is free thereof for longitudinal movement of the shank relative to the bracket.

The shank, when at rest, is normally retained with the upper flat face 8 in contact with the top face 37 of the downwardly opening channel or way 22 by means of the spring 28 as now to be described. The spring 28 is in the form of a coil having one end engaging the spring seat 30 and its opposite end extending above the beam 1 and supporting a spring seat 38. The spring 28 is retained in compression between the seats 30 and 38 by means of a connecting rod 39. The connecting rod passes through the opening 29 of the fixed part and through an elongated opening 40 in the shank (Figs. 2 and 3).

The rod 39 has a transverse T head 41 on its lower end to bear upon the under face 9 of the shank and its other end is provided with threads 42 for mounting a nut 43 so that the T head is drawn tightly against the under face 9 of the shank and the upper face 8 of the shank in clamping engagement with the face 37 of the downwardly opening channel, as best shown in Fig. 4, the nut 43 being tightened to give the desired spring action and pivoting movement of the plow shank 2 between the pins 33 and 34 so that the ground working tool may ride over a rock or other obstruction. The mounting of the spring 28 and rod 39 is such that the spring through the rod 39 applies a force to the forward end 7 of the shank on a line substantially parallel with a tangent to an arcuate guide surface on track later described.

With the structure thus far described, rocking movement of the forward end of the shank downwardly away from the bracket 12 and resistance of the ground working tool to the forward movement of the plow would cause excessive rearward movement of the shank and result in the connecting rod 39 binding within the openings 29 and 40 and wear thereof. However, to avoid these difficulties, I limit rearward longitudinal movement of the shank by providing a guide means including substantially arcuate tracks 44 and 45 that are formed on the forward ends of the flanges 20 and 21. Carried by the terminal of the shank is a yoke shaped bracket 46 having a cross bar portion 47 extending under the shank and having upturned ears 48 and 49 which project upwardly at the respective sides of the shank to support a cross shaft 50. The cross shaft 50 carries a roller 51 that in response to rearward pull of the ground working tool on the respective shank, engages and rolls on the respective tracks 44 and 45 as the forward end of the shank rocks downwardly as shown in Fig. 3. The roller 51 and track portions of the bracket take the rearward longitudinal pull upon the shank and limit the rearward movement thereof relatively to the bracket under rocking movement. However, the shank is free for forward longitudinal movement relative to the bracket for the limit of the total clearance longitudinally of the shank between the rod 39 and elongated openings 29 and 40.

The upper fulcrum pin 33 provides support for the shank when the thrusts of the ground working tool are transmitted upwardly in the direction of the plate portion 13 of the bracket, the upper fulcrum pin 33 being located so that it takes the wear from the rear edge of the plate portion of the fixed part 13. The pin 33, when worn, may be easily removed and replaced with a new pin without requiring replacement of the entire fixed bracket.

The spring 28 controls the pivotal action of the shank. If greater action is required, the nut 43 is backed off to allow expansion of the spring. If less action is required, the nut is tightened against the spring so that the spring more firmly resists vibratory or pumping action of the plow shank.

It will be obvious that with this form of the invention the shanks 2 can bend or flex throughout their length, including that area under the bracket member 12, and provides for resilient action, including vertical movement under direct tension of the spring 28 when the lower end of the shank hits a solid object, thus creating a vibratory action or motion to the shank. Therefore, the roller 51 will not always be against the arcuate surfaces 44 and 45 of the flanges 20 and 21, but will move away therefrom and again rearwardly to contact therewith due to such vibratory action of the shank.

The form of invention shown in Figs. 5 and 6 is similar to the form of the invention just described. However, the track means is mounted on the shank of the ground working tool, and the roller is attached to and carried by the mounting bracket. The mounting bracket is of substantially the same construction as the bracket employed in the form of invention illustrated in Figs. 1 to 4, inclusive, with the exception that the front ends of the depending flanges 52 and 53 terminate in forwardly extending ears 54 and 55 to support the ends of a transverse shaft 56 at a point in substantial registry with the spring seat portion 27 of the bracket. The shaft 56 mounts a roller 57 that is engaged by an arcuate tongue 58 that is fixed to the upper face of the terminal end of the shank 2.

In the illustrated instance, the tongue 58 has a laterally turned portion 59 that is fixed to the shank by a bolt 60 that extends through registering openings 61 and 62 as best shown in Fig. 5. The bolt has a nut 63 that is threaded on the shank 64 of the bolt to back a washer 65 against the under side of the tool shank 2.

The bracket in this form of the invention also includes a plate 66 having a hook portion 67 engaged over the upper flange 4 of the I beam. The opposite side of the plate is connected with the portion 25 of the bracket by a tie bolt 68 having a head end 69 engaged within a recess 70 of the bracket portion 27. The opposite end of the bolt extends through an opening 71 in the plate 66 and carries a nut 72 which, when tightened, draws the bracket and hook like plate 66 in firm engagement with the I beam.

In the form of invention illustrated in Figs. 7 and 8, the depending flanges 73 and 74 terminate short of the end of the shank 2 in arcuate tracks 75 and 76 which extend from sides of downwardly opening recesses 77 and 78 that are in alignment with the elongated openings 29 and 40 of the bracket and shank.

In this form of the invention, the transverse head 79 of the T bolt is of greater width so that the ends 80 and 81 thereof extend beyond the guide tracks 73 and 74 to carry rollers or sleeves 82 and 83 as shown in Fig. 7. The bearing sleeves or rollers are retained on the ends of the T shape head by cotter pins 84 and 85 that are passed through openings 86 and 87 in the ends of the head. Thus, with this form of the invention, the rollers are mounted directly on the T shape head so that the longitudinal thrust on the shank is applied directly to the T shape head. In this form of the invention, the shank will directly engage the connecting bolt as indicated at 88. However, the tracks 75 and 76 eliminate possibility of binding of the T bolt within the respective openings and prevent wear thereof since the rearward longitudinal pull is taken by the rollers directly against the tracks 75 and 76.

From the foregoing, it is obvious that I have provided a tool shank mounting that is of simple and light weight construction and which is provided with guide means to take the rearward longitudinal pull of the shank so that the sliding movement between the shank of the T bolt and bracket and shank is substantially eliminated and so that the relative movement of the shank is under control.

What I claim and desire to secure by Letters Patent is:

1. In a plow having a frame and a ground working tool provided with a shank member, a mount for attaching and supporting the shank member of the ground working tool for rocking movement on the frame of the plow where in normal ground working the resistance of the ground to forward movement of the shank tends to move the shank rearwardly of the frame, in which said mount includes a bracket member adapted to be fixed to the frame of the plow and having a portion extending forwardly of said frame forming a stop for the forward portion of the shank member, said forwardly extending portion of said backet terminating in a substantially vertical portion, spaced flanges on the bracket member at respective sides of said stop portion forming a downwardly open way to retain the shank member therebetween, means extending between said flanges for forming a transverse axis about which the shank member is adapted to rock to and from said stop portion, an arcuate guide surface on the forward end of each of the flanges of the bracket member wherein the curvature of the arcuate guide is substantially radial with respect to the transverse axis on which the shank member is adapted to rock and terminates at its upper portion in the vertical portion of said bracket, a spring having one end seated upon one member, means connecting its other end with said other member to apply force to the forward portion of the shank on a line substantially parallel with a tangent of said arcuate surface for urging the forward portion of the shank toward said stop portion and yieldingly retaining the forward portion of the shank member against said stop portion, the connection of said last named means with said other member being confined within said open way, a roller, a roller supporting means fixed on the shank member and rotatably mounting said roller in position relative to the said vertical portion of the bracket member and the arcuate guide surfaces for rolling contact therewith in response to rearward pull exerted on the shank by ground resistance to forward movement thereof whereby the engagement of the roller on the vertical portion of the bracket member and arcuate surface acts independently of the spring and limits rearward movement only of the shank during the entire rocking movement thereof.

2. The invention defined in claim 1, wherein the shank member is of rectangular cross-section with the upper flat side of the forward end engaging the underside of the bracket member between said flanges so that the shank member will flex throughout its length in response to rearward pull thereon.

3. The invention defined in claim 1 wherein the means extending between the flanges for forming a transverse axis about which the shank member is adapted to rock to and from the stop portion includes spaced pins loosely mounted in said flanges and between which said shank member extends.

4. The invention defined in claim 1 wherein the roller supporting means fixed on the shank member includes a U-shaped bracket having upstanding spaced arms provided with aligned openings in their free ends secured to the forward end of the shank and a transverse pin engaging in said openings in the arms upon which said roller is mounted.

References Cited in the file of this patent

UNITED STATES PATENTS

| | | |
|---|---|---|
| 2,493,811 | Graham | Jan. 10, 1950 |
| 2,674,172 | Graham | Apr. 6, 1954 |

FOREIGN PATENTS

| | | |
|---|---|---|
| 253,298 | Great Britain | June 17, 1926 |
| 269,394 | Great Britain | Apr. 21, 1927 |